US009097198B2

(12) United States Patent
Budiscak et al.

(10) Patent No.: US 9,097,198 B2
(45) Date of Patent: Aug. 4, 2015

(54) METHOD FOR CALIBRATING AN INJECTION QUANTITY

(75) Inventors: Benoit Budiscak, Hohenhaslach (DE); Andreas Rupp, Marbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 669 days.

(21) Appl. No.: 13/440,520

(22) Filed: Apr. 5, 2012

(65) Prior Publication Data

US 2012/0255524 A1 Oct. 11, 2012

(30) Foreign Application Priority Data

Apr. 7, 2011 (DE) ........................ 10 2011 006 915

(51) Int. Cl.
*G01M 15/04* (2006.01)
*F02D 41/24* (2006.01)
*F02D 41/08* (2006.01)

(52) U.S. Cl.
CPC .............. *F02D 41/247* (2013.01); *F02D 41/08* (2013.01)

(58) Field of Classification Search
CPC ...................................................... G01M 15/04
USPC ............... 73/114.45, 114.46, 114.47, 114.48, 73/114.49, 114.51
See application file for complete search history.

(56) References Cited

U.S. PATENT DOCUMENTS

| | | | | | |
|---|---|---|---|---|---|
| 4,462,372 | A | * | 7/1984 | Jackson | 123/452 |
| 4,783,009 | A | * | 11/1988 | Coates | 239/580 |
| 5,806,487 | A | * | 9/1998 | Dolenc | 123/357 |
| 5,839,420 | A | * | 11/1998 | Thomas | 123/478 |
| 6,085,142 | A | * | 7/2000 | Di Leo et al. | 701/104 |
| 8,260,526 | B2 | * | 9/2012 | Loeffler et al. | 701/104 |
| 2009/0177365 | A1 | * | 7/2009 | Jung et al. | 701/103 |
| 2012/0186564 | A1 | * | 7/2012 | Vigild et al. | 123/559.1 |

FOREIGN PATENT DOCUMENTS

| | | |
|---|---|---|
| DE | 198 09 173 | 9/1999 |
| DE | 10 2008 043 165 | 4/2010 |

* cited by examiner

*Primary Examiner* — Eric S McCall
(74) *Attorney, Agent, or Firm* — Kenyon & Kenyon LLP

(57) ABSTRACT

A method for calibrating an injection quantity of an injection system, using which fuel is to be injected into at least one combustion chamber of an internal combustion engine of a device, in which data of at least one zero point quantity calibration, which is carried out in an idling operation of the mechanical device, and data of at least one zero point quantity calibration, which is carried out in an overrun condition of the device, are combined.

10 Claims, 2 Drawing Sheets

METHOD FOR CALIBRATING AN INJECTION QUANTITY

RELATED APPLICATION INFORMATION

The present application claims priority to and the benefit of German patent application no. 10 2011 006 915.1, which was filed in Germany on Apr. 7, 2011, the disclosure of which is incorporated herein by reference.

FIELD OF THE INVENTION

The present invention relates to a method and a device for calibrating an injection quantity.

BACKGROUND INFORMATION

In an internal combustion engine which may also be used in a motor vehicle, for example, fuel is injected by an injection system into at least one combustion chamber of the internal combustion engine. In this instance, it may be provided that one should individually adjust a quantity of fuel to be injected to the operating behavior of the internal combustion engine that comes about during stable operation.

German document DE 10 2008 043 165 A1 discusses a method and a device for calibrating the injection quantity of a partial injection in an injection system of an internal combustion engine, especially of a motor vehicle. A correction value is ascertained, in this context, for a partial injection into an individual cylinder of the internal combustion engine by stimulation of an injection pattern and by changing a rotational speed vibration caused by the injection pattern.

A method for controlling fuel injection is discussed in document DE 198 09 173 A1. A quantity-determining element determines the fuel quantity to be injected into the internal combustion engine, in this instance, in at least one determined operating state, at least one adjustment value being ascertained, for the correction of a signal which determines the activation duration of the quantity determining element. A signal of a sensor is used, for ascertaining the adjustment value, which detects the exhaust gas composition.

SUMMARY OF THE INVENTION

Against this background, a method and a system having the features described herein are provided. Additional developments of the present invention result from the further descriptions herein.

In the method according to the present invention, in the embodiment, a calibration takes place of the injection quantity which is to be injected into at least one combustion chamber of the internal combustion engine. An energy-based evaluation of the rotational speed takes place while using a zero point quantity calibration at operation at idling speed (ZFL) and a zero point quantity calibration in an overrun condition (ZFC). It is provided to carry out the zero point quantity calibration in operation at idling speed as well as in overrun condition, in each case at least once, and combine and/or supplement the data ascertained, usually so-called learning values, for the quantity to be injected.

Consequently, in the method for determining the data for the fuel injection quantity, results of the two described types of zero point quantity calibration are used, the data from the zero point quantity calibration in idling operation being able to be plausibility-checked by data from the zero point quantity operation in the overrun condition and/or combined. Alternatively or supplementarily it is also possible to check the plausibility of data from the zero point quantity calibration in the overrun condition by data from the zero point quantity calibration at idling operation and/or combine them. In each case, provided algorithms are used to carry out the two measures for zero point quantity calibration.

An injection process for a combustion chamber may include at least one partial injection, e.g. in the form of a pre-injection and/or a post-injection, and a main injection. As a rule, such an injection operation, besides a main injection, may include at least one pre-injection and one post-injection. An injection quantity of one of the partial injections mentioned and of the main injection depends, among other things, on the activation duration at which an injection valve assigned to the combustion chamber is actuated as at least one component of the injection system via a control signal. In this instance, an injection nozzle of the injection valve is opened and a fuel injection quantity resulting from the activation duration is injected into the combustion chamber that is developed, for instance, as a cylinder.

In the zero point quantity calibration, a calibration may be undertaken of the injection quantity for at least one partial injection that is usually developed as a pre-injection in idling operation or in overrun condition as possible operating situations of the internal combustion engine. In this context, in a combustion chamber developed as a cylinder, alternatingly a simple injection is applied as the main injection and a dual or multiple injection is applied, which includes at least one pre-injection as partial injection and one main injection.

Accordingly, in a zero point quantity calibration, a reaction is ascertained, independently of the operating situation, of the rotational speed of the internal combustion engine to a variation in the activation duration. Alternatively, in the zero point quantity calibration, two pre-injections and one main injection may be carried out, as well as varied, in each case the first pilot injection of an injection process being able to be alternatingly switched off and on again. During the execution of the zero point quantity calibration, a small, minimum injection quantity is determined, which comes about from a minimum activation duration, and whereby a change is effected in the torque and/or the rotational speed of the internal combustion engine.

Alternatively or supplementary, in the zero point quantity calibration, the activation duration of the at least one pre-injection and/or of the main injection is able to be varied until an effect of a variation, undertaken in the activation duration, for certain frequencies of a signal of the rotational speed of the internal combustion engine, becomes zero. It is possible for components of frequencies to be superposed on the signal of the rotational speed, which correspond to a simple or multiple frequency of the cam shaft, and may come about based on an asymmetry in the rotation of the camshaft. These superimposed frequencies may be minimized in the case of one executable variant of the zero point quantity calibration by adjusting the activation duration, and thus perhaps eliminated, so that an injection quantity is ascertained in which at least one such superimposed frequency is controlled to zero.

This zero point quantity calibration may be carried out in idling operation of the internal combustion engine. Accordingly, within the scope of the exemplary embodiments and/or exemplary methods of the present invention, in the zero point quantity calibration in idling operation, as the first measure to be used, first learning values are ascertained as data for injection quantities, which come about based on variation of the activation duration, and are able to be verified by a reaction of the rotational speed of the internal combustion engine. In idling operation, the internal combustion engine has a minimum rotational speed, so that the internal combustion engine is running without, in this connection, generating a significant torque, within the scope of measurable tolerances, and driving a usually mechanical device, such as a motor vehicle. In the zero point quantity calibration, in idling operation, it is ascertained at which minimum injection quantity work is done by the internal combustion engine, and a significant torque is generated within the scope of measurable tolerances.

As a second measure for implementing the exemplary embodiments and/or exemplary methods of the present invention, the zero point quantity calibration in overrun condition is carried out as a further operating situation of the internal combustion engine. In this instance, the reaction of the rotational speed in the overrun condition is evaluated when the injection quantity for one combustion chamber is changed by the variation of the activation duration. The overrun or trailing throttle condition is present if the internal combustion engine has energy supplied to it by an additional machine, such as an electric motor in a hybrid drive and/or a drive assembly, such as via the wheels in downhill travel, and it is consequently driven, i.e. dragged or pushed, it being able to be provided supplementary that no fuel be injected for the internal combustion engine, in order to implement the externally driven overrun operation. In this operating situation, the zero point quantity calibration may be carried out during operation, it being also ascertained at which minimum injection quantity for the internal combustion engine a torque is generated.

The zero point quantity calibrations that are able to be carried out during the respective operating situation may be differently combined as measures of the exemplary embodiments and/or exemplary methods of the present invention. This brings about different variants for providing learning values as data for a learning characteristics map and for storing them in the learning characteristics map. This learning characteristics map represents a dependence of an injection quantity, for at least one partial injection, during an injection process on an activation duration as operating parameter. In this context, the learning characteristics map for different values of a pressure of the fuel in a fuel accumulator in the injection system, also known as rail pressure, may include various curves, in each case one curve for a value of a pressure representing a function of the injection quantity of the activation duration.

It is conceivable, for instance, that after the ascertainment of the first learning values for the learning characteristics map in idling operation, the zero point quantity calibration in overrun condition is activated, so as to determine the second learning values for the learning characteristics map. As a rule, the second learning values are more accurate than the first learning values. Independently of this, for supplying and/or supplementing, typically for the interpolation of the learning characteristics map, the first learning values may be interpolated by the second learning values. Alternatively or supplementary, the second learning values could also be interpolated by the first learning values, for this purpose. The zero point quantity calibration in idling operation and/or the zero point quantity calibration in the overrun condition is always able to be automatically activated when the internal combustion engine, and thus the device, is in the respective operating situation.

In response to a possibility for combining the two provided zero point quantity calibrations, the zero point quantity calibration in idling operation is activated as a quick calibration. In this connection, first learning values are ascertained for the learning characteristics map in case it has no learning values. The reason for this may be that the learning characteristics map, after just previously finished manufacture of the internal combustion engine, is not yet filled up with learning values. It is also possible that the learning characteristics map has been reset during servicing, and since then has no learning values.

The zero point quantity calibration idling operation may be activated during servicing in a repair shop, so as to ascertain first learning values after an exchange of a control unit, which are subsequently supplemented by the second learning values during zero point quantity calibration in overrun condition.

When the zero point quantity calibration is carried out in idling operation during servicing in a repair shop, the effects of noise developments or emissions may be minimized, which for motor vehicles, usually for passenger vehicles or commercial vehicles, are only rarely operated in overrun condition. Consequently, at least the first learning values are ascertained for the learning characteristics map, which are supplemented by second learning values when the motor vehicle is in overrun condition.

The two measures for zero point quantity calibration may be used in parallel. This may mean that a zero point quantity calibration is always activated and/or carried out when a respective operating situation, i.e. an idling operation or an overrun condition comes about. Consequently, at least one zero point quantity calibration is able to be carried out in an idling operation alternating with at least one zero point quantity calibration in overrun condition, upon at least one zero point quantity calibration in idle operation being able to be followed by at least one zero point quantity calibration in overrun condition, and vice versa. In this way, first and second learning values may be ascertained alternating. Because of this, a small proportion of an idling operation and an overrun condition, besides other operating situations of the internal combustion engine of a motor vehicle, may be compensated for, e.g. in start/stop systems and/or hybrid applications, and consequently, faster learning results may be achieved. The zero point quantity calibration in idling operation may be carried out relatively fast outside the overrun condition of the internal combustion engine.

The zero point quantity calibration in idling operation, as well as the zero point quantity calibration in the overrun condition, may be configured simultaneously. After the ascertainment of the learning values of the two operating situation-dependent measures for zero point quantity calibration, the learning values are checked with one another for plausibility.

Using the method provided, because of the learning characteristics map supplied, which includes the first and second learning values, the functioning of a device which includes the internal combustion engine and the injection system, may be checked for functional capability. If this turns up that there has been an error, an error path may be set and a corresponding signal supplied, which is usually able to be done via a lamp for indicating a malfunction, the so-called MI lamp (malfunction indicator lamp). It is also possible, however, by using the learning characteristics map supplied within the scope of the method, to demonstrate exhaust gas-relevant malfunctions, if any, even if the MI lamp is not activated.

The system, according to the exemplary embodiments and/or exemplary methods of the present invention, is configured to execute all of the steps of the method provided. Individual steps of this method are also able to be implemented by individual components of the system. Furthermore, functions of the system, or functions of individual components of the system, may be implemented as steps of the method. In addition, it is possible that steps of the method are implemented as functions of at least one component of the system or of the entire system.

Additional advantages and developments of the exemplary embodiments and/or exemplary methods of the present invention result from the specification and the appended figures.

It is understood that the features mentioned above and the features yet to be described below may be used not only in the combination given in each case but also in other combinations or individually, without departing from the scope of the exemplary embodiments and/or exemplary methods of the present invention.

DETAILED DESCRIPTION

Figure 1:
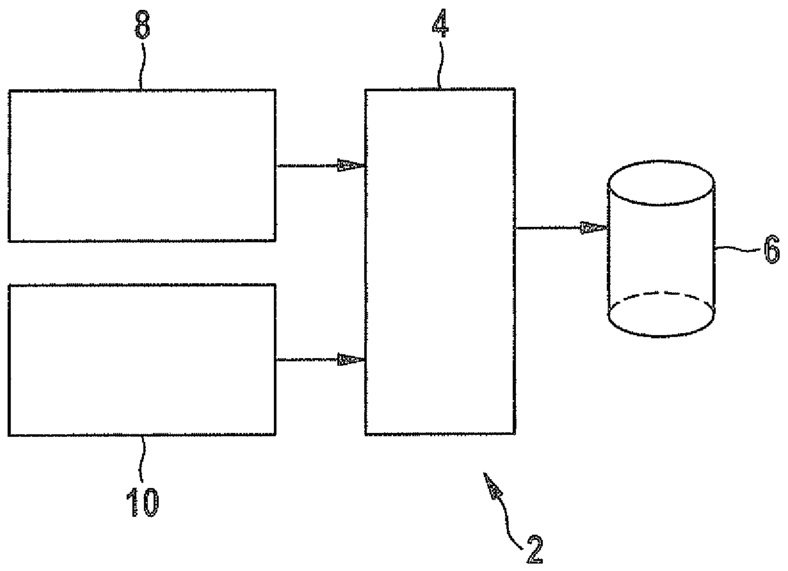
FIG. 1 shows a schematic representation of a first specific embodiment of a system according to the present invention.

The exemplary embodiments and/or exemplary methods of the present invention are represented schematically in the drawings with the aid of specific embodiments, and is described in detail below with reference to the drawings.

The figures are described in a cohesive and comprehensive manner; the same reference numerals denote identical components.

The first specific embodiment of system 2 according to the present invention includes a coordination module 4 as well as an in-common learning characteristics map 6. In addition, FIG. 1 shows a zero point quantity calibration in idling operation 8 and a zero point quantity calibration in overrun condition 10 as steps of a first specific embodiment of a method according to the present invention, which is able to be carried out by system 2.

The method is provided for calibrating an injection quantity of an injection system, which is developed to inject fuel into at least one combustion chamber of an internal combustion engine of a usually mechanical device, such as a motor vehicle. In this connection, data from at least one zero point quantity calibration, that is carried out in an idling operation 8 of the mechanical device, and data from at least one zero point quantity calibration, that is carried out in an overrun condition 10 of the device, are combined with one another and mutually supplemented, if necessary.

Coordination module 4 that is shown is developed to coordinate the use of the zero point quantity calibration in idling operation 8 and the zero point quantity calibration in overrun condition 10.

In the method, in the embodiment, data are ascertained for learning characteristics map 6, which includes the dependence of the injection quantity on at least one additional operating parameter of the injection system and/or the internal combustion engine. In this instance, data values may be ascertained for an activation duration, from which the at least one injection quantity comes about, perhaps as a function of the pressure of the fuel, for at least one partial injection of an injection process.

In a further embodiment of the method, in the at least one zero point quantity calibration carried out in idling operation, first learning values are ascertained as data, and in the at least one zero point quantity calibration carried out in overrun condition, second learning values are ascertained as data. Furthermore, data which are ascertained in at least one first of the two zero point quantity calibrations to be carried out, that is, are ascertained in idling operation or in overrun condition, are combined with data which are ascertained in at least one first of the two zero point quantity calibrations to be carried out, that is, are ascertained in idling operation or in overrun condition, are supplemented, as a rule and/or corrected. This may mean that, at first, the zero point quantity calibration is carried out in idling operation 8, for instance, as a so-called quick calibration.

The zero point quantity calibration in idling operation 8 and the zero point quantity calibration in overrun condition 10 may be carried out in parallel or synchronously. The two zero point quantity calibrations may be carried out as often as possible, if the opportunity comes about for it when the respective operating situation is present.

Figure 2:
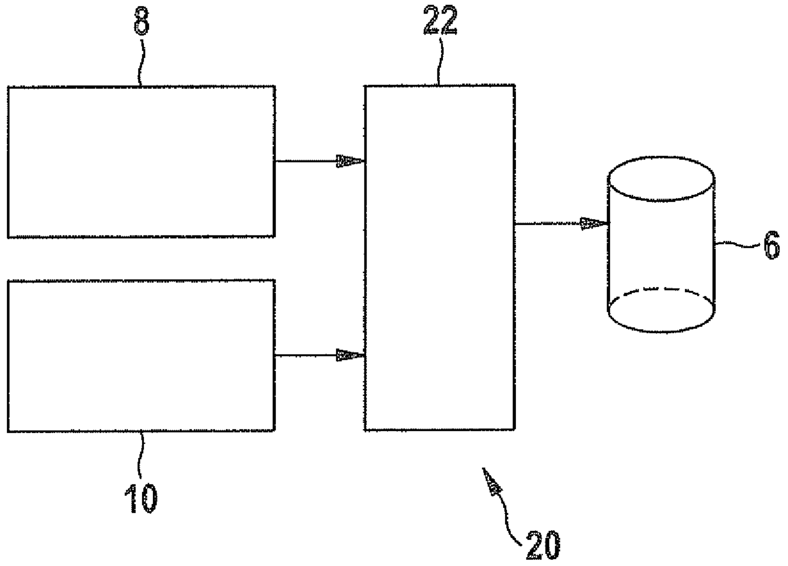
FIG. 2 shows a schematic representation of a second specific embodiment of a system according to the present invention.

The second specific embodiment, shown in FIG. 2, of system 20 according to the present invention, besides the learning characteristics map 6 includes a plausibilization module 22, which is developed to check the plausibility of the data ascertained in the zero point quantity calibrations carried out. Consequently, data of the zero point quantity calibration in idling operation 8, developed as first learning values, may have their plausibility checked by data, usually second learning values, of the zero point quantity calibration in overrun condition 10, and vice versa.

Figure 3:
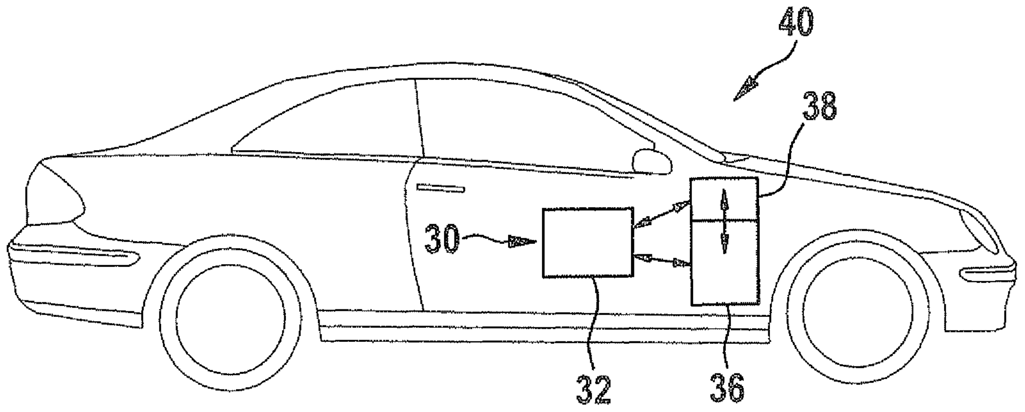
FIG. 3 shows a schematic representation of a second specific embodiment of a system according to the present invention.

The third specific embodiment shown schematically in FIG. 3, of system 30, according to the exemplary embodiments and/or exemplary methods of the present invention, may have at least one of the modules introduced in FIGS. 1 and 2, i.e. coordination module 4 and/or plausibilization module 22, as well as learning characteristics map 6, which are situated within a control unit 32 of this system 30. System 30, having control unit 32, is situated in motor vehicle 40 shown schematically in FIG. 3. FIG. 3 also shows an internal combustion engine 36 as well as an injection system 38 of motor vehicle 40.

Control unit 32, as component of system 30 for calibrating an injection quantity of an injection system, is developed to combine data of at least one zero point quantity calibration, that is carried out in an idling operation 8 of the motor vehicle, with the data of at least one zero point quantity calibration, that is carried out in an overrun condition 10. The data are stored as learning values in a storage module of control unit 32 within a learning characteristics map 6.

The method may be carried out for at least one injection process of injection system 38, which includes at least one pre-injection and a main injection, and in which the injection quantity is injected into the at least one combustion chamber of internal combustion engine 36. In a zero point quantity calibration which is carried out in one of the operating situations described, a signal may be monitored for a rotational speed of internal combustion engine 36.

What is claimed is:

1. A method for calibrating an injection quantity of an injection system, in which fuel is injected into at least one combustion chamber of an internal combustion engine of a device, the method comprising:

obtaining data of at least one zero point quantity calibration, which is carried out in an idling operation of the device;

obtaining data of at least one zero point quantity calibration, which is carried out in an overrun condition of the device;

combining the data of the at least one zero point quantity calibration carried out in the idling operation and the data of the at least one zero point quantity calibration carried out in the overrun condition; and calibrating the injection quantity of the injection system.

2. The method of claim 1, wherein the data of the at least one zero point quantity calibration carried out in the idling operation and the data of the at least one zero point quantity calibration carried out in the overrun condition are ascertained for a learning characteristics map, which includes a dependence of the injection quantity on at least one additional operating parameter of at least one of the injection system and the internal combustion engine.

3. The method of claim 1, wherein as data, values are ascertained for an activation duration, from which an injection quantity comes about for at least one partial injection of an injection process.

4. The method of claim 1, wherein as data, first learning values are ascertained in the at least one zero point quantity calibration carried out in idling operation.

5. The method of claim 1, wherein as data, second learning values are ascertained in the at least one zero point quantity calibration carried out in overrun condition.

6. The method of claim 1, wherein the data of the at least one zero point quantity calibration carried out in the idling operation, is at least one of supplemented and corrected by the data of the at least one zero point quantity calibration carried out in the overrun condition.

7. The method of claim 1, wherein the zero point quantity calibration in the idling operation is carried out as a quick calibration, data that are ascertained in the zero point quantity calibration in the idling operation being at least one of supplemented and corrected by data which are ascertained in the zero point quantity calibration in the overrun condition.

8. A system for calibrating an injection quantity of an injection system, in which fuel is injected into at least one combustion chamber of an internal combustion engine of a device, comprising:

a control unit configured to combine data of at least one zero point quantity calibration, which is carried out in an idling operation of the device, and data of at least one zero point quantity calibration, which is carried out in an overrun condition of the device, the control unit further configured to calibrate the injection quantity of the injection system.

9. The system of claim 8, further comprising:

a coordination module configured to coordinate the use of the zero point quantity calibration in the idling operation and the zero point quantity calibration in the overrun condition.

10. The system of claim 8, further comprising:

a plausibility checking module configured to check the plausibility of the data ascertained in the two zero point quantity calibrations carried out.

* * * * *